United States Patent
Yoshida et al.

(10) Patent No.: US 6,946,751 B2
(45) Date of Patent: Sep. 20, 2005

(54) WIND POWER GENERATION SYSTEM

(75) Inventors: Yasuo Yoshida, Tokyo (JP); Hiroshi Jimbo, Tokyo (JP); Takatoshi Egami, Tokyo (JP); Yoshihito Hirano, Tokyo (JP); Toshiyuki Ando, Tokyo (JP); Hitoshi Nakayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 30 days.

(21) Appl. No.: 10/713,031

(22) Filed: Nov. 17, 2003

(65) Prior Publication Data

US 2004/0183307 A1 Sep. 23, 2004

(30) Foreign Application Priority Data

Mar. 19, 2003 (JP) ........................................ 2003-076295
Sep. 25, 2003 (JP) ........................................ 2003-333979

(51) Int. Cl.[7] .............................. H02P 9/04; F03D 9/00
(52) U.S. Cl. .............................. 290/44; 290/43; 290/55; 290/53; 290/54; 417/343; 416/31
(58) Field of Search .............................. 290/44, 55, 43, 290/54, 33; 417/343; 416/31

(56) References Cited

U.S. PATENT DOCUMENTS 4,651,017 A * 3/1987 Longriig ...................... 290/44
5,194,754 A * 3/1993 Mikami ........................ 290/55
6,320,272 B1 * 11/2001 Lading et al. ................ 290/44

FOREIGN PATENT DOCUMENTS

| JP | 11-159436 | 6/1999 |
|----|-----------|--------|
| JP | 2000-87841 | 3/2000 |
| JP | 2000-175360 | 6/2000 |
| JP | 2002-152975 | 5/2002 |

* cited by examiner

Primary Examiner—Darren Schuberg
Assistant Examiner—Iral A. Mohandesi
(74) Attorney, Agent, or Firm—Leydig, Voit & Mayer, Ltd.

(57) ABSTRACT

A wind power generation system capable of outputting generated power at high efficiency with a smoothed output power includes a wind power generator and a laser aerovane mounted on the wind power generator or located near the wind power generator. Direction and velocity of wind blowing toward the wind power generator are observed using the laser aerovane, and a yaw angle and/or a pitch angle of the wind power generator is predicted and controlled based on the observation results. Thus, high-efficiency control of the wind power generation system, including the wind power generator, is achieved. An output-smoothing device connected to the wind power generator predicts and controls electric power input/output of the output-smoothing device based on a predicted power output of the wind power generator and smoothes the power output of the wind power generation system.

13 Claims, 14 Drawing Sheets

Fig. 1

WIND POWER GENERATION SYSTEM

BACKGROUND OF THE INVENTION

1. Field of the Invention

The present invention relates to a wind power generation system for observing in advance a state of wind ahead of a wind power generator and high-efficiency operation control of the wind power generator or controlling and smoothing output of the whole system including the wind power generator.

2. Description of the Related Art

In one of conventional wind power generation systems for predicting a state of wind, a wind vector ahead of the wind power generator is measured with the use of a Doppler radar utilizing radio wave, an output value of the wind power generator is predicted on the basis of the wind vector, and output control of the electric power system side generator is carried out on the basis of the predicted output value (see the Japanese Patent Publication (unexamined) No. 2002-152975, for example).

In another conventional system, a combination of a wind power generator and a Diesel-engine generator is used as a wind power generation system. On the basis of a value actually measured by anemometers placed around the wind power generator, a value of energy output generated by the wind power generator is calculated using a wind-velocity database. If the calculated output value increases, the Diesel-engine generator is stopped, while if the output value decreases, the Diesel-engine generator is operated (see the Japanese Patent Publication (unexamined) No. 1999-159436, for example).

In the conventional wind power generation system disclosed in the mentioned Japanese Patent Publication (unexamined) No. 2002-152975, information on wind-state prediction is utilized only in the aspect of output suppression control of other generator. Hence a problem exists in that it is impossible to achieve improvement in performance of the wind power generator itself and in efficiency of the whole system.

In the conventional wind power generation system disclosed in the Japanese Patent Publication (unexamined) No. 1999-159436, only electric power of a certain quantity is supplied by controlling the Diesel engine generator combined with the wind power generator. Hence a problem exists in that it is impossible to achieve improvement in performance of the wind power generator itself.

Wind power is one of the most environment-friendly natural energy, and utilization of the wind power with high-efficiency is increasingly a socially desired demand. However, mechanical innovation in the wind power generator is not always easy due to its simple structure.

SUMMARY OF THE INVENTION

The present invention was made to solve the above-discussed problems and has an object of obtaining a wind power generation system capable of predicting state of wind and carrying out high-efficiency operation control of the wind power generation system or predicting state of wind and stabilizing (smoothing) output thereof.

According to the invention, a wind power generation system includes a wind power generator and a laser aerovane either mounted on the mentioned wind power generator or arranged near the wind power generator, and in which the mentioned laser aerovane observes direction and velocity of a wind blowing toward the mentioned wind power generator, at least either yaw angle or pitch angle of the mentioned wind power generator is controlled on the basis of results obtained by the observation, whereby output of the wind power generation system including the wind power generator is controlled.

In the wind power generation system of above construction, it is possible to carry out high-efficiency operation control of the wind power generation system.

Another wind power generation system according to the invention includes: a wind power generator, a laser aerovane either mounted on the mentioned wind power generator or arranged near the wind power generator, and an output-smoothing device connected to the mentioned wind power generator; and in which the mentioned laser aerovane observes direction and velocity of a wind blowing toward the mentioned wind power generator, an output adjustment amount of the mentioned wind power generator is calculated in advance on the basis of results obtained by the observation, output of the wind power generation system including the mentioned wind power generator and the mentioned output-smoothing device is controlled on the basis of conditions obtained by the calculation, and output of the whole wind power generation system is smoothed.

In the wind power generation system of above construction, it is possible to accurately suppress fluctuation in output of the wind power generation system or accurately smooth (stabilize) the output amount thereby stabilizing supply of electric power.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 1 is a sectional view showing a, wind power generator according to Embodiment 1 of the present invention.

FIG. 13 and FIG. 14 jointly show one flowchart.

DESCRIPTION OF THE PREFERRED EMBODIMENTS

Embodiment 1

Figure 2:
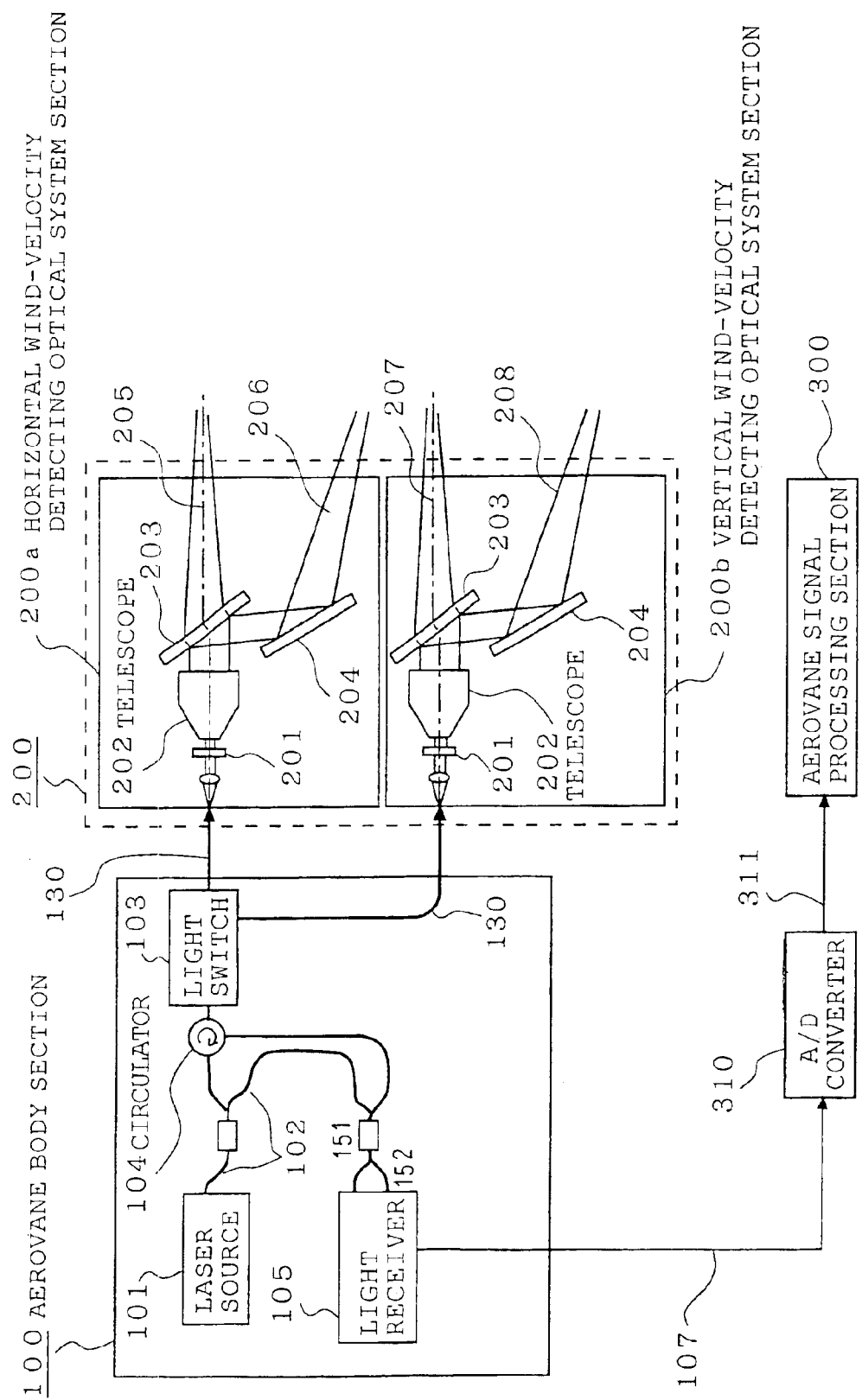
FIG. 2 is a schematic diagram showing constitution of a laser aerovane according to Embodiment 1 of the invention.

Embodiment 1 of the invention is hereinafter described with reference to FIGS. 1 to 6.

Figure 1:
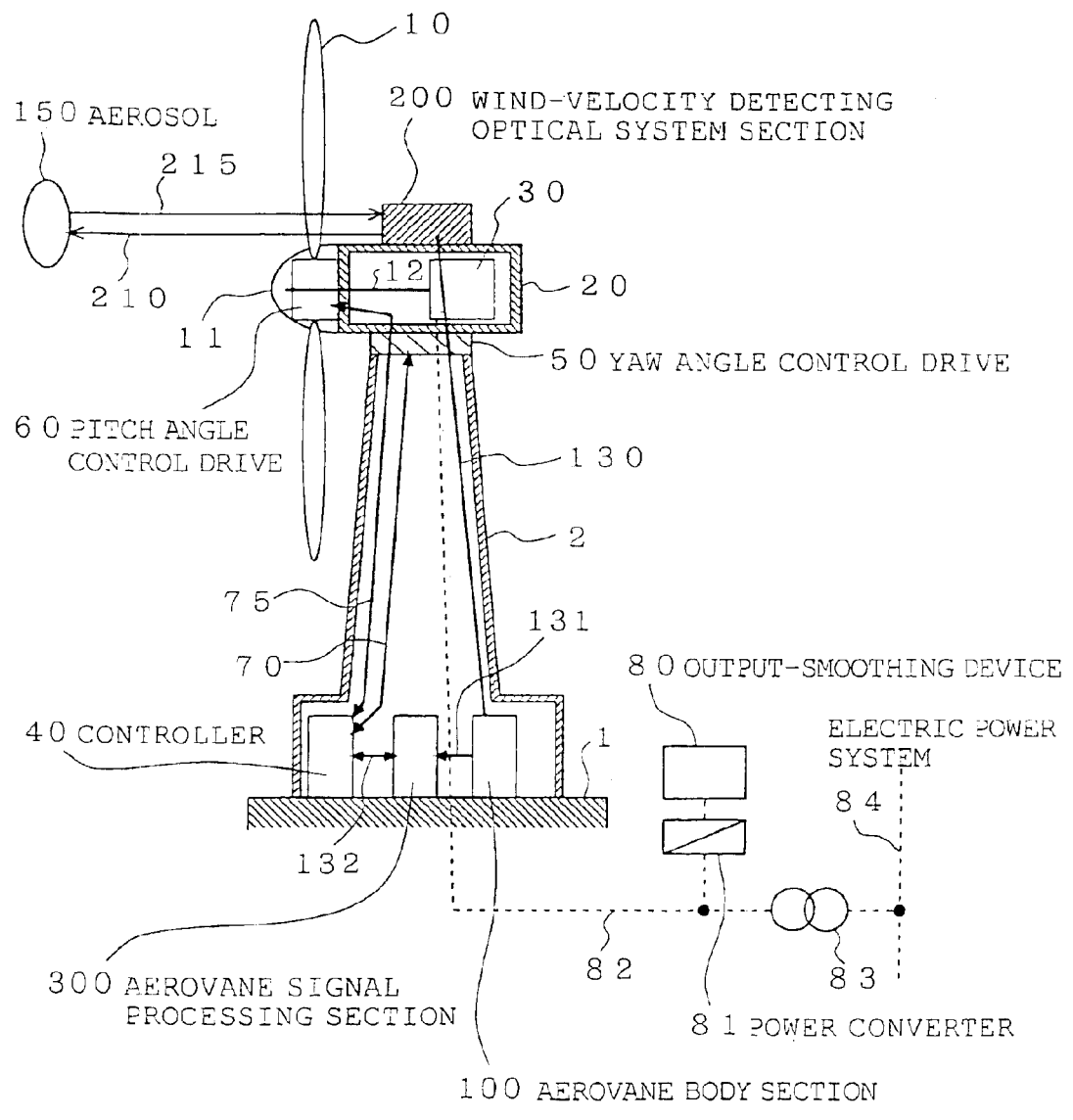

FIG. 1 is a sectional side view of a wind power generator (a windmill). As shown in FIG. 1, a tower section 2 is built on a pedestal 1, and a yaw angle control drive 50 is mounted on the top of the tower section 2. Furthermore, a nacelle 20 controlled so as to rotate within a horizontal plane by driving the yaw angle control drive 50 is mounted on the top of the yaw angle control drive 50. It is desirable to control the windmill so that plane where a propeller of the windmill rotates is changed conforming to change in direction of wind and catches the wind right in front at all times. It is yaw angle that is changed at this time, and controlling the yaw angle is called yaw control. Rotating the nacelle 20 within a horizontal plane can change the yaw angle.

Blades 10 constituting a propeller of the propeller-type windmill are mounted on a rotary shaft 12 through a hub (the portion on which the blades 10 are attached) 11, and driving a pitch angle control drive 60 controls angle of the blades 10. In order to effectively utilize wind energy, it is necessary that each blade 10 catching the wind is located at an optimum angle, and the angle of the blades 10 at this location are called pitch angle (blade angle). A generator 30, an amplifier (not shown in the drawing) and so on connected with the rotary shaft 12 are accommodated in the nacelle 20. The propeller rotates on a plane perpendicular to the rotary shaft 12 on which the blades 10 are mounted.

A wind-velocity detecting optical system section (hereinafter referred to as the optical system section) 200 emits a laser beam 210 to irradiate aerosol 150 ahead of (at an arbitrary distance from) the wind power generator with the laser beam and detects a scattered light 215 of the laser beam 210. The optical system section 200 is mounted on the top of the nacelle 20. The aerosol 150 is a kind of dust in the air moving with the wind at the same velocity and in the same direction as the wind. Therefore, direction and velocity of the wind at a place can be observed by grasping movement of the aerosol 50. Information obtained from the scattered light 215 (data on the wind direction and wind velocity of the aerosol 150) is sent to an aerovane body section (hereinafter referred to as main body section) 100 through an optical fiber 130. Data for calculating the wind direction and wind velocity of the aerosol 150 are extracted from the scattered light 215 and processed in the main body section 100. The data on the wind direction and wind velocity obtained in the main body section 100 are sent to an aerovane signal processing section (hereinafter referred to as signal processing section) 300 through a communication system section 131. On the basis of the data on the wind direction and wind velocity of the aerosol 150, the signal processing section 300 predicts a state of the wind (wind direction, wind velocity, arrival time of wind, and so on) blowing toward the wind power generator, i.e., a state of the wind to be utilized in generating electric power in the near future (after several to several tens seconds). The main body section 100, optical system section 200, and signal processing section 300 constitute a laser aerovane.

The data on wind-state prediction calculated by the signal processing section 300 is transmitted to a controller 40 through a communication system section 132. On the basis of the given wind-state data, the controller 40 issues a command to the yaw angle control drive 50 and the pitch angle control drive 60 through communication system sections 70 and 75. The yaw angle control drive 50 causes the yaw angle to change and the pitch angle control drive 60 causes the pitch angles to change. Thus, it becomes possible to operate the wind power generator with high-efficiency, i.e., high-efficiency utilization of wind power energy. The controller 40 scans and grasps current yaw angle, pitch angles, and number of rotations of the windmill shaft (number of rotations or rotation speed) at all times.

Furthermore, a power cable 82 connected to the generator 30 is connected to an electric power system 84 acting as an output terminal. An output-smoothing device 80 is connected and arranged between the generator 30 and the electric power system 84 through a power converter 81, when required, and a transformer 83 is arranged between the electric power system 84 and the power converter 81.

Number of rotations of the windmill is fixed, adjustable step by step, otherwise continuously adjustable within a predetermined range.

The optical system section 200 of the laser aerovane can be located on the ground at some distance from the tower section 2 of the wind power generator or on the top of a pole set up near the wind power generator on condition that the yaw angle is variable. It is also preferable that the optical system section 200 is mounted on a side face of the tower section 2.

The blades 10 receive the wind and convert wind power energy into a rotating force and the generator 30 converts the rotation energy of the blades 10 into an electric power.

The controller 40 or another controlling mechanism receives and analyzes data necessary for controlling the wind power generator such as yaw angle, number of rotations of the windmill, etc. and current direction and velocity of the wind. Then the controller 40 or another controlling mechanism gives a control command to each control drive (for example, braking equipment) of the wind power generator.

Now, an example of construction and operation principle of the laser aerovane according to the invention is hereinafter described with reference to FIG. 2. The laser aerovane is mainly comprised of the main body section 100, the optical system section 200, and the signal processing section 300 as described above. A part of the laser beam 210 emitted from a laser source 101 (for example, semiconductor laser) of the main body section 100 is sent to a light receiver 105 through an optical fiber 102. The rest of the beam is sent to a light switch 103 through a circulator 104. The light switch 103 sends inputted light to the optical system section 200. The optical system section 200 is comprised of two sections, for example, a horizontal wind-velocity detecting optical system section 200a and a vertical wind-velocity detecting optical system section 200b. The received light is divided and sent to the horizontal and vertical wind-velocity detecting optical system sections 200a and 200b respectively.

The light sent from the light switch 103 to the horizontal wind-velocity detecting optical system section 200a is then sent to a telescope 202 through a half-wave plate 201. The light emitted from the telescope 202 is split into a P-polarized light 205 passing through a deflection beam splitter 203 and an S-polarized light 206 reflected from the deflection beam splitter 203. The P-polarized light 205 is emitted to outside as it is, and the S-polarized light 206 is reflected from a total reflection mirror 204 and emitted to outside. The vertical wind-velocity detecting optical system section 200b is of the same construction as the horizontal wind-velocity detecting optical system section 200a, and in which a P-polarized light 207 and an S-polarized light 208 are emitted to outside.

The P-polarized light 205 and the S-polarized light 206 emitted from the horizontal wind-velocity detecting optical system section 200a are respectively emitted in two different directions on the horizontal plane. The P-polarized light 207 and the S-polarized light 208 emitted from the vertical wind-velocity detecting optical system section 200b are respectively emitted in two directions on the vertical plane.

The P-polarized lights 205 and 207 and the S-polarized lights 206 and 208 correspond to the laser beam 210 shown in FIG. 1.

The P-polarized light 205, which is the laser beam 210 emitted from the optical system section 200, comes into the aerosol 150 and is scattered. Thus, the P-polarized light 205 turns into a scattered light (corresponding to the scattered light 215 shown in FIG. 1, for example) and returns to the optical system section 200 as described later. This scattered light 215 follows the reverse course through which the scattered light 215 was emitted, and is sent from the optical system section 200 to the main body section 100. The scattered light 215 is sent to the circulator 104 via the light switch 103, and the circulator 104 sends the necessary scattered light 215 to the optical fiber coupler 151 as a optical mixer. The scattered light 215 and the laser beam 210 directly sent from the laser source 101 are mixed in the optical fiber coupler 151 and sent to the light receiver 105 converts the mixed light 152 into a detection signal 107 and sends the detection signal 107 to the A/D converter 310. The A/D converter 310 converts the trigger 106, which is an analog light signal, and the detection signal 107 into a digital signal, and sends this digital signal serving as a reception signal 311 to the signal processing section 300 through the communication system section 131. The signal processing section 300 receives the reception signal 311, carries out a predetermined calculation described later, and calculates (observes) direction and velocity of the wind at a focal point of the laser beam 210 (position of the focal point corresponds to the position of the aerosol 150). Further, a state of wind is predicted on the basis of the obtained data of the wind direction and wind velocity (observation result), and necessary control information is sent to the controller 40 through the communication system section 132.

A continuous wave is employed as the laser beam 210. Especially, when employing a continuous wave of approximately 1500 nm in wavelength, scattered light from the aerosol 150 is most strong, and state of the wind is detected with accuracy. In addition, the laser beam of approximately 1500 nm in wavelength is most gentle to human eyes and is desirable in view of safety.

It is possible to adopt a method utilizing a pulse wave as the laser beam 210 instead of using a continuous wave as described in this example, and either of them is preferable. Furthermore, it is also preferable to arrange any mechanical aerovane on the top of the nacelle 20 and additionally use data of this mechanical aerovane in order to improve accuracy in measuring direction and velocity of wind, when required.

In a case where the Doppler effect is utilized to detect direction and velocity of wind, it is known that the detection becomes more accurate in inverse proportion to the wavelength of the laser beam or sound wave employed in the detection. In making a comparison between the sound wave and the laser beam, state of the wind is detected more accurately when the laser beam, whose wavelength is shorter than that of the sound wave, is employed.

Figure 3:
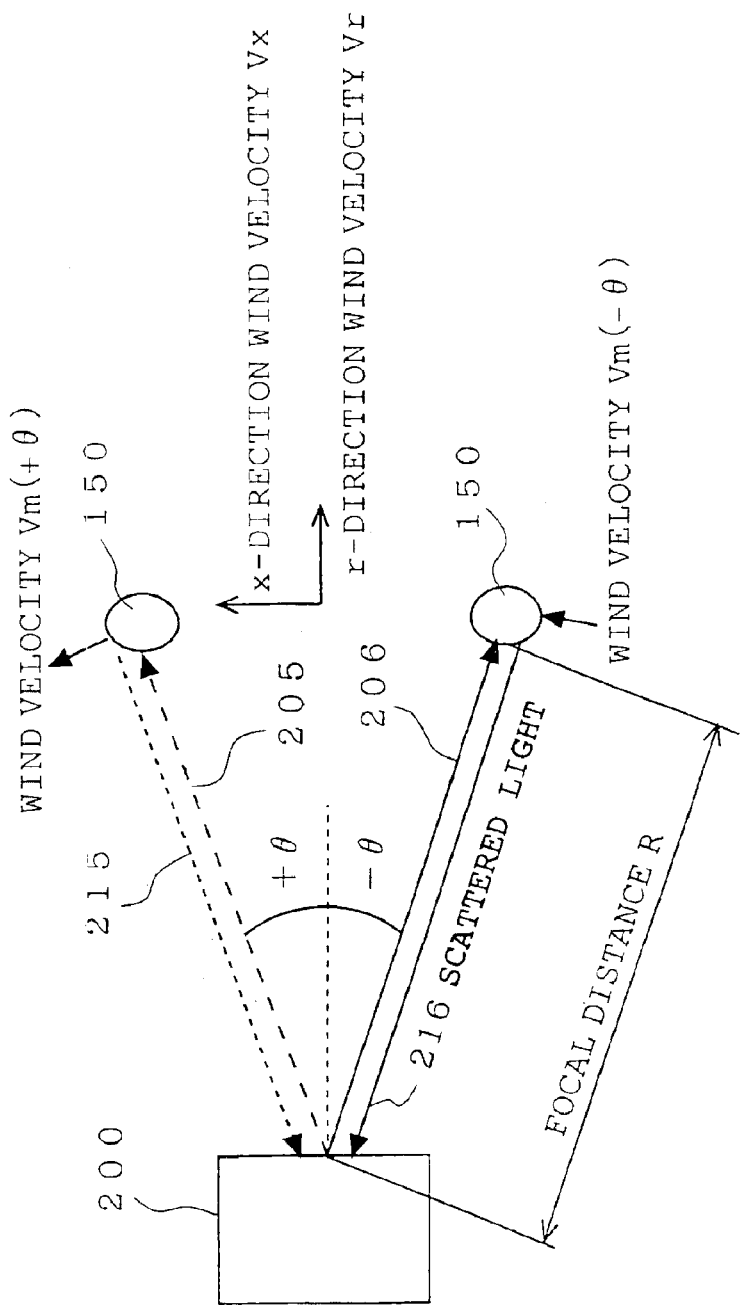
FIG. 3 is a schematic view showing S-polarized light and P-polarized light according to Embodiment 1 of the invention.

Now, the P-polarized light 205 and the S-polarized light 206 emitted from the horizontal wind-velocity detecting optical system section 200a are hereinafter described with reference to FIG. 3. The P-polarized light 205 and the S-polarized light 206 are respectively emitted from the optical system section 200 onto a horizontal plane in a direction at an angle +θ and in a direction at an angle −θ, on the basis of an arbitrary direction, and focused at places distant by a focal distance R (corresponding to an arbitrary distance) by means of a lens of the telescope 202. The lights are scattered from the aerosol 150 in the vicinity of the focal points, where the scattered light (scattered light of the P-polarized light) 215 and the scattered light (scattered light of the S-polarized light) 216 are generated respectively. The air contains a lot of aerosol 150, and therefore scattered waves are also generated from points other than the focal points, but the scattered waves from the vicinity of the focal points have the highest scattering energy. Since these scattered waves (the scattered lights 215 and 216) are scattered from the aerosol 150 moving with a certain velocity, a frequency shift of $F_D$ takes place due to the Doppler effect (Doppler shift). This shift in frequency is measured, and velocity of the aerosol 150 is calculated.

The P-polarized light 207 and the S-polarized light 208 are emitted from the vertical wind-velocity detecting optical system section 200b on a vertical plane in a direction at an angle +θ and in a direction at an angle −θ on the basis of an arbitrary direction respectively. As described above, it is possible to detect a three-dimensional vector of the wind velocity of the aerosol 150 ahead of the wind power generator by emitting the laser beams 210 in at least three or four directions and obtaining data on each light. In the case where the laser beams 210 are emitted only in two directions, it is possible to detect a two-dimensional vector of the wind velocity.

In addition, angle of emission of the laser beam 210 is preferably θ=approximately 5°, and this preferable angle varies depending upon the conditions such as distance to the aerosol 150 to be observed.

Now, an example how a velocity of wind is calculated by the signal processing section 300 is herein after described. Information on the scattered lights 215 and 216 and information directly obtained from the laser source 101 are combined into a detection signal 107. The detection signal 107 is received as a reception signal 311, and the Doppler shift $F_D$ from the frequency of the laser source 101 to the scattered lights 215 and 216 is calculated. There is a relation between $F_D$, laser wavelength λ, and aerosol velocity Vm as shown in the following expression (1).

Expression (1):

$$F_D = 2\frac{V_m}{\lambda}$$

The wind velocity Vm (+θ) and the wind velocity Vm (−θ) in the ±θ directions are calculated by this expression. The wind velocity Vr (r indicates a direction along θ=0 on a horizontal plane) and the wind velocity Vx (x indicates a direction perpendicular to θ=0 on a horizontal plane) are calculated using the following expression (2) and expression (3).

Expression (2):

$$V_r = \frac{V_m(-\theta) + V_m(+\theta)}{2\cos\theta}$$

Expression (3):

$$V_x = \frac{V_m(-\theta) - V_m(+\theta)}{2\sin\theta}$$

The calculation as described above is carried out also on the data obtained by the vertical wind-velocity detecting optical system section 200b, and combining with the data obtained by the horizontal wind-velocity detecting optical system section 200a, a three-dimensional vector of the wind velocity can be calculated. Thus wind direction and wind velocity of the aerosol 150 are measured with accuracy.

Figures 4A, 4B:
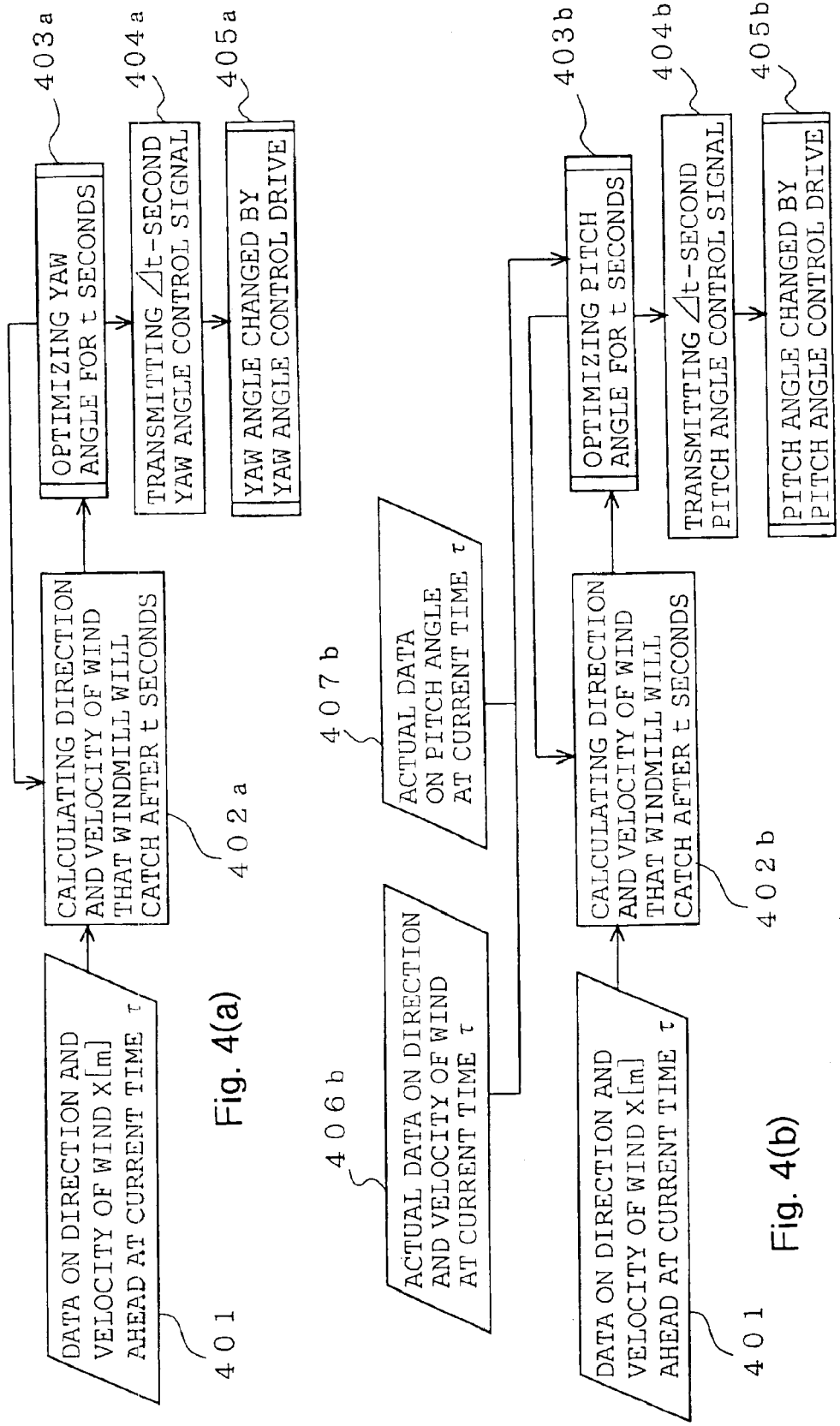
FIGS. 4(a) and 4(b) are flowcharts showing yaw angle/pitch angle control logic according to Embodiment 1 of the invention.

An example of yaw angle control logic according to the invention is hereinafter described with reference to the flowchart in FIG. 4(a). First, the laser aerovane measures direction and velocity of the wind X[m] ahead (located at an arbitrary distance from the wind power generator) at the current time τ (step 401). On the basis of the obtained data on the direction and velocity of the wind, a wind direction φ (τ+t) of the wind that the wind power generator will catch after t seconds is calculated (step 402a). For example, for measuring direction and velocity of the wind 400 m ahead, if the wind is blowing toward the wind power generator at a velocity of 10 m per second, it is predicted that the wind will arrive at the wind power generator after 40 seconds. Thus the change in direction and velocity of the wind that the wind power generator will utilize in generating an electric power after 40 seconds can be predicted with accuracy. For the purpose of predicting the wind blowing against the wind power generator in the near future on the basis of data on wind direction and wind velocity of the aerosol 150, it is preferable to prepare preliminarily data base on the measured wind direction and wind velocity of the aerosol 150 as well as on the direction and velocity of actual arrival of wind, and carries out a calculation on the basis of the data base. The process up to this stage is carried out by the laser aerovane, and data on the predicted wind direction, wind velocity, and time of arrival (data including the observation results) is sent to the controller 40 through the communication system section 132.

If yaw angle control signals are transmitted from the controller 40 to the yaw angle control drive 50 through the communication system section 70 with an interval of Δt (for example, 1 second), direction of the wind predicted at a point of time τ, i.e., the optimum yaw angle is shown in the following expression (4).

Expression (4):

$$\psi(\tau+\Delta t), \psi(\tau+2\Delta t), \psi(\tau+3\Delta t), \ldots, \psi(\tau+i\Delta t), \ldots, \psi(\tau+n\Delta t)(n=t/\Delta t)$$

If the current yaw angle is φ (τ) a yaw angle in the future that can be predicted and controlled is shown in the following expression (5).

Expression (5):

$$\phi(\tau+\Delta t), \phi(\tau+2\Delta t), \phi(\tau+3\Delta t), \ldots, \phi(\tau+i\Delta t), \ldots, \phi(\tau+n\Delta t)(n=t/\Delta t)$$

At this stage, the maximum rotation angular velocity of the yaw angle is ω (for example, 0.70°/sec.), and the yaw angle is determined so that conditions of the following expression (6) are satisfied and value of the following expression (7) becomes the smallest, thus the yaw angle being optimized (step 403a).

Expression (6):

$$\left| \frac{\phi(\tau+(i+1)\Delta t) - \phi(\tau+i\Delta t)}{\Delta t} \right| \leq \omega \quad (i=0, 1, 2, \ldots, n-1)$$

Expression (7):

$$\sum_{i=1}^{n} |\psi(\tau+i\Delta t) - \phi(\tau+i\Delta t)|$$

The yaw angle control signal at the time τ+Δt is transmitted from the controller 40 to the yaw angle control drive 50 (step 404a). When receiving this signal, the yaw angle control drive 50 rotates the nacelle 20 and changes the yaw angle (step 405a). This process is repeated, thus the yaw angle can be controlled to the optimum. It is also preferable that the yaw angle is predicted and controlled through any other method on the basis of the data on direction and velocity of wind (observation result) obtained from the laser aerovane as a matter of course.

Now, an example of pitch angle control logic is hereinafter described with reference to FIG. 4(b). Step 401 is the same as that for controlling the yaw angle shown in FIG. 4(a).

On the basis of the yaw angle predicted as described above and the predicted direction and velocity of wind shown in the foregoing expression (4), the direction and velocity of the wind (corresponding to the wind velocity vector [v]) that the blades 10 will catch are accurately predicted as shown in the following expression (8) (step 402b).

Expression (8)

$$[v] = \vec{v}$$

$$\vec{v}(\tau+\Delta t), \vec{v}(\tau+2\Delta t), \vec{v}(\tau+3\Delta t), \ldots, \vec{v}(\tau+i\Delta t), \ldots,$$
$$\vec{v}(\tau+n\Delta t)(n=t/\Delta t)$$

Torque per blade 10 (force of a windmill to rotate when the windmill catches a wind power. The unit of torque is [N·m].) is determined depending upon the windmill shaft rotation angular velocity [θ], direction and velocity of the wind (corresponding to the wind velocity vector [v]) caught by the blade 10, and pitch angle α of the blade 10. Accordingly windmill torque T (τ+iΔt) at the time τ+iΔt can be shown in the following expression (9).

Expression (9):

$$[\theta] = \dot{\theta}$$

$$T(\tau+i\Delta t) = \sum_{j=1}^{m} T_j(\dot{\theta}(\tau+i\Delta t), v_j(\tau+i\Delta t), \alpha_j(\tau+i\Delta t))$$

(m is number of blades)

This function $T_j([\theta], v_j, \alpha_j)$ is measured or simulated in advance so as to be calculated by the controller 40 or the signal processing section 300.

Then, the pitch angle for the t seconds is optimized (step 403b) as described below. At this stage, since the windmill shaft rotation angular velocity [θ] is fixed and the direction and velocity of the wind (corresponding to the wind velocity vector [v]) until the wind is caught by the blades 10 after t seconds are predicted, the optimum pitch angle α' (τ+iΔt) at which the maximum torque is obtained can be calculated at the time τ+iΔt by using the foregoing expression (8). Therefore the optimum pitch angle α' predictable at the time τ can be shown by the following expression (10).

Expression (10)

$$\alpha'(\tau+\Delta t), \alpha'(\tau+2\Delta t), \alpha'(\tau+3\Delta t), \ldots, \alpha'(\tau+i\Delta t), \ldots, \alpha'(\tau+n\Delta t)(n=t/\Delta t)$$

Establishing that the maximum rotation angular velocity of the pitch angle drive is ωp (for example, 15°/sec.), satisfying the following expression (11), the pitch angle is optimized so that value of the following expression (12) becomes the smallest.

Expression (11):

$$\left| \frac{\alpha(\tau + (i+1)\Delta t) - \alpha(\tau + i\Delta t)}{\Delta t} \right| \leq \omega_P \ (i = 0, 1, 2, \ldots, n-1)$$

Expression (12):

$$\sum_{i=1}^{n} |\alpha'(\tau + i\Delta t) - \alpha(\tau + i\Delta t)| \ (i = 1, 2, \ldots, n)$$

The controller 40 transmits the pitch angle control signal of the time τ+Δt to the pitch angle control drive 60 so that the pitch angle becomes the optimum angle α (step 404b). Upon receipt of this signal, the pitch angle control drive 60 changes the pitch angle (step 405b). In this connection, it is desirable to employ actually measured values (actual data) as the wind direction and wind velocity at the current time τ in the calculation (step 406b). It is also desirable to use a current measured value (actual data) of the pitch angle, which the controller 40 obtains by scanning, as the pitch angle α (τ) at the current time τ (step 407b). This process is repeated for each of the plural (three fliers are used in most cases) blades 10, thus the pitch angles of all the blades 10 are controlled and optimized. It is a matter of course that it is possible to predict and control the pitch angle through any other method on the basis of the data on the direction and velocity of the wind (the observation results) obtained from the laser aerovane.

In the conventional method for controlling the pitch angles, it is possible to detect that the wind velocity begins to change, but changing the pitch angle negatively affects on the performance of blades. Particularly if any change in direction of the wind takes place during change in pitch angle, the change in direction of the wind gives any undesirable influence upon the performance of the blades. Moreover, the mechanical aerovane measures a slipstream, which is the wind that has passed through the blades 10 over above the nacelle 20. Therefore the measurement is greatly influenced by slipstream with an approximately one-second cycle (varying depending upon number of rotations of windmill) after passing the blades 10. Consequently, pitch angle can be changed only on the basis of an average value for 1 second. Moreover, in the conventional method, there is any delay in response of machines in actual control, and only passive control with considerable delay is possible.

On the other hand, according to the invention, it is possible to carry out positive control of either yaw angle or pitch angle or both yaw angle and pitch angle taking the delay in response of machines into consideration. Thus the blades 10 keep catching the wind at an approximately optimum pitch angle. As a result, it becomes possible to utilize wind power energy continuously with high-efficiency as compared with the conventional passive control.

It is also possible to suppress the output by suppressing generation of torque. In this case, suppression of the output is easily attained by arbitrarily setting the optimum pitch angle in the foregoing expression (10) so that torque generation is suppressed. As described above, according to the invention, it is possible to easily and accurately control the wind power generator.

Figure 5:
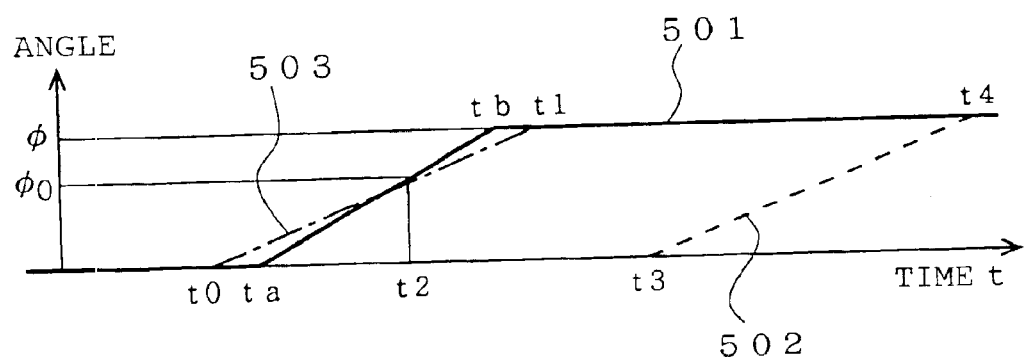
FIG. 5 is a graph showing how output fluctuation is suppressed and controlled according to Embodiment 1 of the invention.

Now, advantages of this Embodiment 1 are hereinafter described with reference to FIG. 5. In FIG. 5, a thick solid line 501 indicates change in the wind actually caught by the wind power generator (actual change in the wind direction). Described below is a case where direction of the wind has changed by Φ (for example, Φ=21°) during a period from time ta to time tb (for example, tb−ta=15 seconds).

In the conventional method for controlling a yaw angle, although it is possible to detect that direction of the wind starts to change at the time ta, the yaw angle is not changed until a change in the wind direction by at least Φ0 (for example, Φ0=15°) has been recognized and such a situation continues for at least a predetermined period (for example, 15 seconds. a period from t2 to t3 in FIG. 5.) as indicated by a broken line 502 (change in yaw angle in the conventional control), which is a passive control as mentioned above. This is because it is necessary to rotate the heavy nacelle 20 part itself in order to change the yaw angle. Accordingly in the case where the yaw angle control drive 50 in FIG. 1 is only capable of rotating the nacelle 20 by approximately 0.7° per second, it takes 30 seconds to rotate 21°, and the wind direction may change during the time period of this 30 seconds. As a result, even if the wind is blowing at approximately 10 meters per second, which is suited for generation of electric power, the delay in yaw angle control brings about a great loss.

On the other hand, according to the invention, it is possible to carry out a positive control as indicated by a thick one-dot chain line 503 (change in yaw angle by making the control of the invention). In this example shown in FIG. 5, the wind-direction change angular velocity (Φ/(tb−ta)) is larger than the maximum yaw angle rotation angular velocity (Φ/(t1−t0)=0.7°/sec.), and therefore it is not always possible to completely follow the wind. But, the direction and velocity of the wind that the wind power generator will catch and the arriving time of the wind are predicted on the basis of the data on the wind direction and wind velocity (the observation results) obtained by the laser aerovane. Accordingly the yaw angle is controlled so that the propeller rotation plane may coincide with the predicted wind direction at the predicted time of arrival, and consequently, it is possible to keep catching the wind approximately right in front as is understood from FIG. 5. As a result, it is possible to utilize wind power energy continuously and efficiently as compared with the conventional passive control. When the wind-direction change angular velocity is smaller than the yaw rotation angular velocity, it is possible to completely follow the change in wind direction, and it is possible to more efficiently utilize wind power energy than in the conventional passive control.

According to the invention, since the main body section 100 of the laser aerovane operates so as to keep catching the wind right in front together with the nacelle 20, it is also possible to increase the value of the Doppler shift $F_D$. As a result, there is a further advantage of improving accuracy in detecting direction and velocity of the wind.

Although the optical system section 200 of the laser aerovane is arranged on the nacelle 20 by fixing the optical system section 200 to the nacelle 20 in the foregoing example, it is also preferable that any control drive for driving and rotating the optical system section 200 is arranged on the nacelle 20 so that the optical system section 200 is rotated not only by the nacelle 20 but also by such a dedicated control drive.

Further, although the main body section 100 and the signal processing section 300 are arranged inside the tower section 2 in the foregoing example, it is also preferable that the main body section 100 and the signal processing section 300 are arranged outside the tower section 2. In this arrangement, it is required that communication with other components is kept under good conditions.

The output control or output fluctuation suppression control of the wind power generation system according to the invention is hereinafter described in detail.

The wind power generation system containing a wind power generator includes: a wind power generator comprised of the fliers (blades) 10, the nacelle 20, the generator 30, the tower section 2, and so on; the laser aerovane for detecting the wind blowing toward the windmill at a point ahead of the windmill; and a control and arithmetic section for predicting output of generated electric power on the basis of predicted values of wind direction and wind velocity calculated by the foregoing laser aerovane and determining a control amount of the output of the generated electric power. (This control and arithmetic section corresponds to, for example, the controller 40. It is also possible to connect and use a separately arranged exclusive arithmetic section). The output-smoothing device 80 for satisfying the control amount is incorporated in the construction, when required.

The output-smoothing device 80 is a device connected and arranged outside the wind power generator for smoothing the output, and is further connected to the power cable 82 which, in turn, is connected to the generator 30 through the power converter 81. Further, as described above, the transformer 83 is arranged on the power cable 82 between the power converter 81 and the electric power system 84 where electric power generated by the wind power generator is outputted.

The output of the wind power generation system is suppressed by, for example, regulating amount of electric power generated by the windmill. In this case, yaw control for changing direction of the windmill and/or pitch control for changing angle of the blade are carried out on the basis of prediction data on the wind direction and wind velocity calculated based on the observation result of the laser aerovane. Thus, input energy of the wind power itself is controlled, thereby output of the wind power generation system being controlled.

It is necessary to secure a measurement range of the laser aerovane so that there is sufficient time for controlling the system. A distance of approximately 200 m is enough to secure the sufficient time under normal conditions.

Rated wind velocity of a wind power generation system is 10 to 20 meters per second in general. Assuming that direction and velocity of the wind approximately 200 m ahead are grasped, it takes for the wind at least several to several tens seconds to arrive at the windmill, and this period of time is sufficient to control the windmill in advance by predicting direction and velocity of the wind.

In the foregoing example according to the invention, the laser aerovane observes the direction and velocity of the wind blowing toward the wind power generator, and the yaw angle and the pitch angle of the wind power generator are controlled on the basis of the observation result, whereby output of the wind power generation system including the wind power generator is controlled. It is also preferable that either the yaw angle or only the pitch angle of the wind power generator alone is separately controlled on the basis of the observation result of the laser aerovane, thereby carrying out high-efficiency operation control of the wind power generation system, as a matter of course.

The foregoing description is about a construction in which output of the system includes a normal type wind power generator 30, and the system is controlled by regulating input energy of the wind power itself. Like control is carried out in the case where the laser aerovane is arranged in the wind power generator provided with a variable-speed generator.

Figure 6:
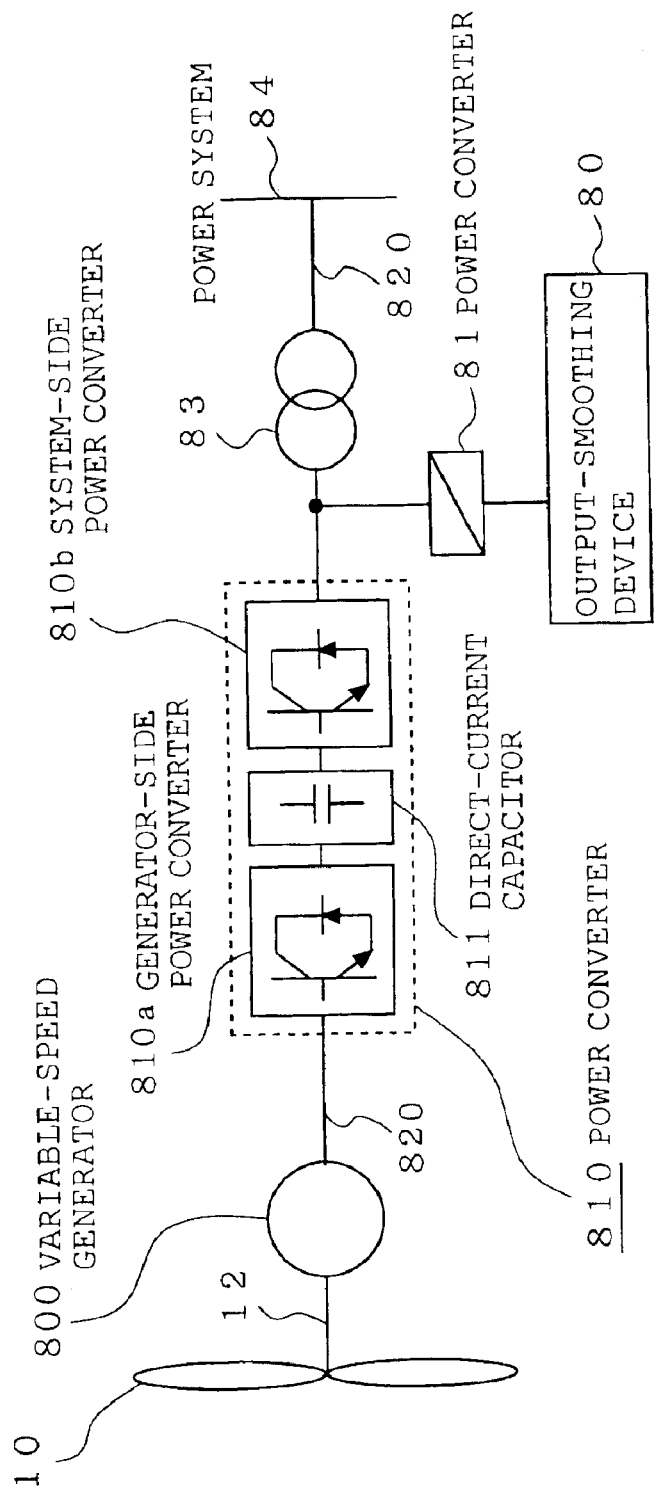
FIG. 6 is a schematic diagram of a power converter and an output-smoothing device arranged and connected to a variable-speed generator according to Embodiment 1 of the invention.

FIG. 6 shows a schematic diagram of constitution of a variable-speed wind power generation system. This system is provided with a variable-speed generator 800 in place of the foregoing normal type wind power generator 30. The variable-speed generator 800 and a power converter 810 are connected through a power cable 820. The power converter 810 is comprised of a generator-side power converter 810a, a direct-current capacitor 811, and a system-side power converter 810b arranged and connected in order from the side near the variable-speed generator 800. Furthermore, the transformer 83 is arranged between the electric power system 84 and the power converter 810, and the output-smoothing device 80 is arranged between the transformer 83 and the power converter 810, when required, through the power converter 81.

The direct-current capacitor 811 controls active power of output of the variable-speed generator 800, and voltage of this direct-current capacitor rises when the active power flows from the generator-side power converter 810a into the direct-current side. A deviation between this voltage of the direct-current capacitor 811 and a reference direct-current voltage given in advance as a command value is amplified and used as an active current command of the alternating-current side (the system-side power converter 810b side). This active current is increased and controlled and the electric power flows into the system. The detailed construction of the wind power generator is the same as the wind power generator provided with the normal type generator 30, and further detailed description is omitted here.

In the variable-speed generator 800, the power converter (810a, 810b) controls output of the variable-speed generator 800. When a strong wind blows momentarily, energy of the wind power is temporarily stored in the form of mechanical energy as an increase in rotation speed of the variable-speed generator 800. On the contrary, when velocity of wind lowers, rotation energy of the variable-speed generator 800 is converted into electric energy. Accordingly, the variable-speed generator 800 has a characteristic of smoothing the output of the wind power generation system. In other words, it is possible to suppress and control output fluctuation in the wind power generation system.

In the conventional variable-speed wind power generation system, for example, when velocity of wind lowers for a long time (in minute), rotation speed (number of rotations) decreases in order to smooth the electrical output in the same manner as in the foregoing case. It is, however, not possible to sufficiently compensate the decrease in the output over a long time, and it is inevitable that the decrease in wind velocity brings about a decrease in output power.

On the contrary, the preliminary prediction and control according to the invention makes it possible to predict a decrease in wind velocity in advance and reduce a decrease in output power, and as a result the output is smoothed. It will be possible to attain variable-speed generation through any other method. It is possible to employ any other method on condition that variable-speed generation is possible.

In the case where this invention is applied to the mentioned variable-speed-type wind power generation system, the mentioned characteristic of smoothing the electrical output is carried out more effectively. More specifically, in the variable-speed-type wind power generation system, on the basis of the prediction data, if wind power energy to be received in the future is high, electric power is generated as preliminarily planned. Thus the wind power generator stands by at a minimum rotation speed and the wind power energy is stored as mechanical energy to the maximum capacity. On the other hand, if wind power energy to be received in the future is low, rotation energy is converted into electrical energy and outputted as preliminarily planned. As a result, the influence upon the system at every moment is minimized by controlling number of rotations of the wind power generator and suppressing frequency fluctuation and voltage fluctuation caused by the output of electric power generated by the wind power generation system to be within a regulated range. Thus it becomes possible to make a control of smoothing the generated output of the system.

Embodiment 2

Figure 7:
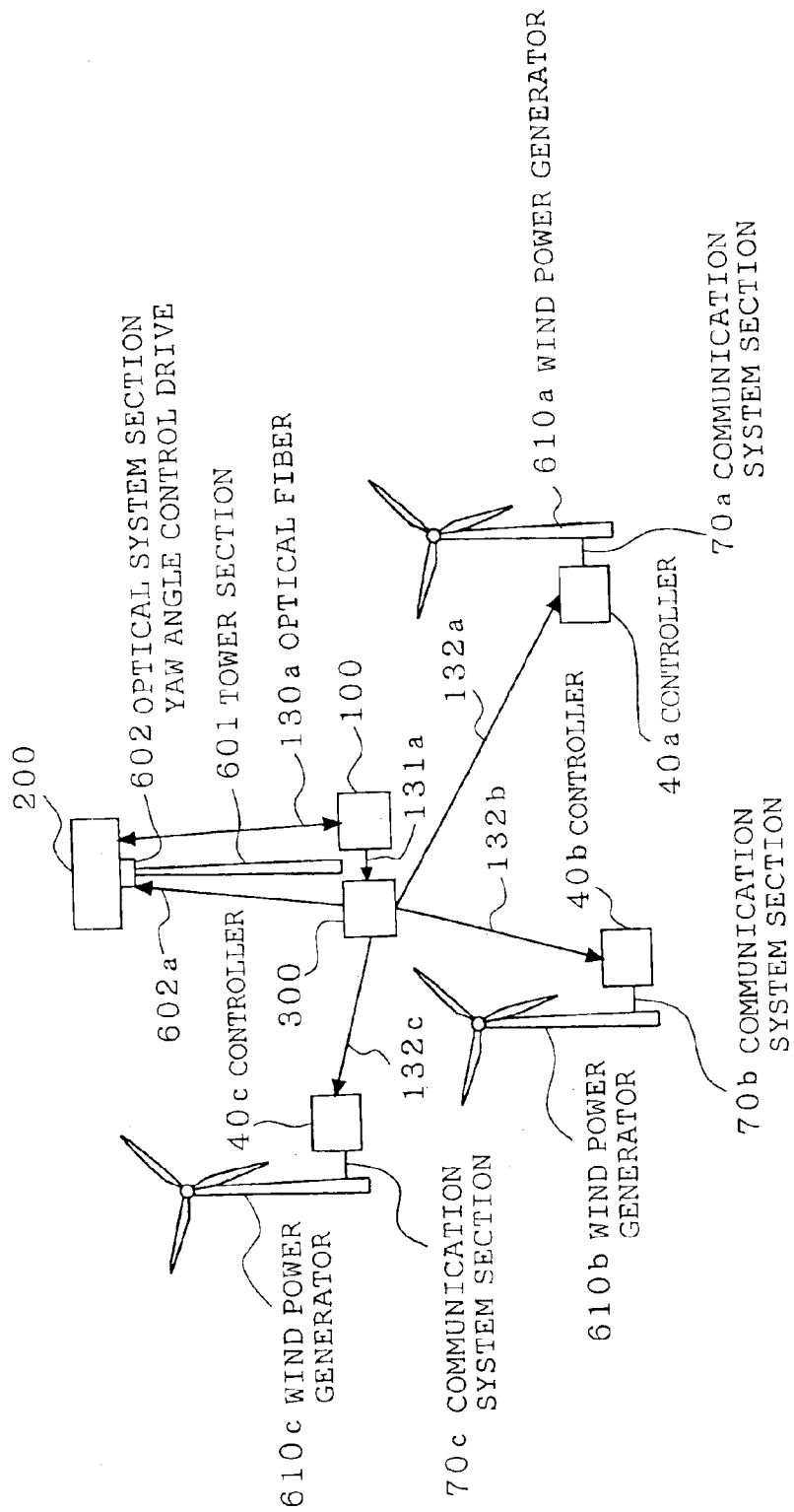
FIG. 7 is a schematic diagram showing constitution of a wind farm according to Embodiment 2 of the invention.

Embodiment 2 of the invention is hereinafter described below with reference to FIG. 7. FIG. 7 is a schematic view of constitution of a wind farm provided with plural wind power generators 610a to 610c. FIG. 7 shows a state that an optical system section 200 (corresponding to the wind-velocity detecting optical system section) of the laser aerovane arranged in the middle of the wind farm. A tower section (pole) 601 is built in the middle of the plural wind power generators 610a to 610c, and the optical system section 200 is mounted on the tower section 601 through an optical system section yaw angle control drive 602 (hereinafter referred to as drive). The optical system section 200 is connected to the main body section 100 through an optical fiber 130a. The main body section 100 and the signal processing section 300 are connected through a communication system section 131a. The signal processing section 300 is connected to controllers 40a to 40c of the wind power generators through communication system sections 132a to 132c respectively. The signal processing section 300 and the drive 602 are connected through a communication system section 602a. The controllers 40a to 40c are connected to the wind power generators 610a to 610c through communication system sections 70a to 70c respectively.

The drive 602 changes direction of the optical system section 200 on the basis of the output from the signal processing section 300 so that the optical system section 200 may at all times catch the wind right in front. Otherwise the drive 602 causes the optical system section 200 to rotate at a fixed speed so that direction and velocity of the wind are measured in all circumferential direction. It is also preferable, that the optical system section 200 and the drive 602 are arranged on the ground in the case where there is almost nothing to obstruct the wind around. The laser aerovane is capable of measuring direction and velocity of the wind at a convergence point that is arranged X[m] ahead (for example, 400 m ahead) of the most distant wind power generator (corresponding to 610a in the case of FIG. 7) from the tower section 601 or detecting the direction and velocity of the wind at this distance using a pulse-type laser. Furthermore, in addition to the function of processing signal of the direction and velocity of the wind described in the foregoing Embodiment 1, the signal processing section 300 has calculation function used in optical system section yaw angle control, calculation function for controlling output of the variable-speed wind power generator in case of using the variable-speed wind power generator, and calculation function used in yaw angle/pitch angle control of each wind power generator.

Now, an example of operation logic according to Embodiment 2 is hereinafter described with reference to the flowchart in FIG. 8. First, the laser aerovane measures direction and velocity of the wind at a point X[m] ahead at the current time τ (step 701). Then, in Operation 1, the direction and velocity of the wind that the optical system section 200 will catch after t seconds are calculated (step 711). A yaw angle is calculated so that the optical system section 200 comes to the optimum yaw angle after t seconds (step 712). A calculated control signal is transmitted to the drive 602 (step 713), and the drive 602 changes the yaw angle on the basis of that signal (step 714). The calculation is carried out in the same manner as described in the foregoing Embodiment 1. However, in the case of using a drive capable of measuring direction and velocity of the wind in all circumferential directions by rotating the optical system section 200 at a fixed speed to measure a state of the wind in all circumferential directions, it is not necessary to carry out the above-mentioned yaw control operation of the optical system section 200.

Figure 8:
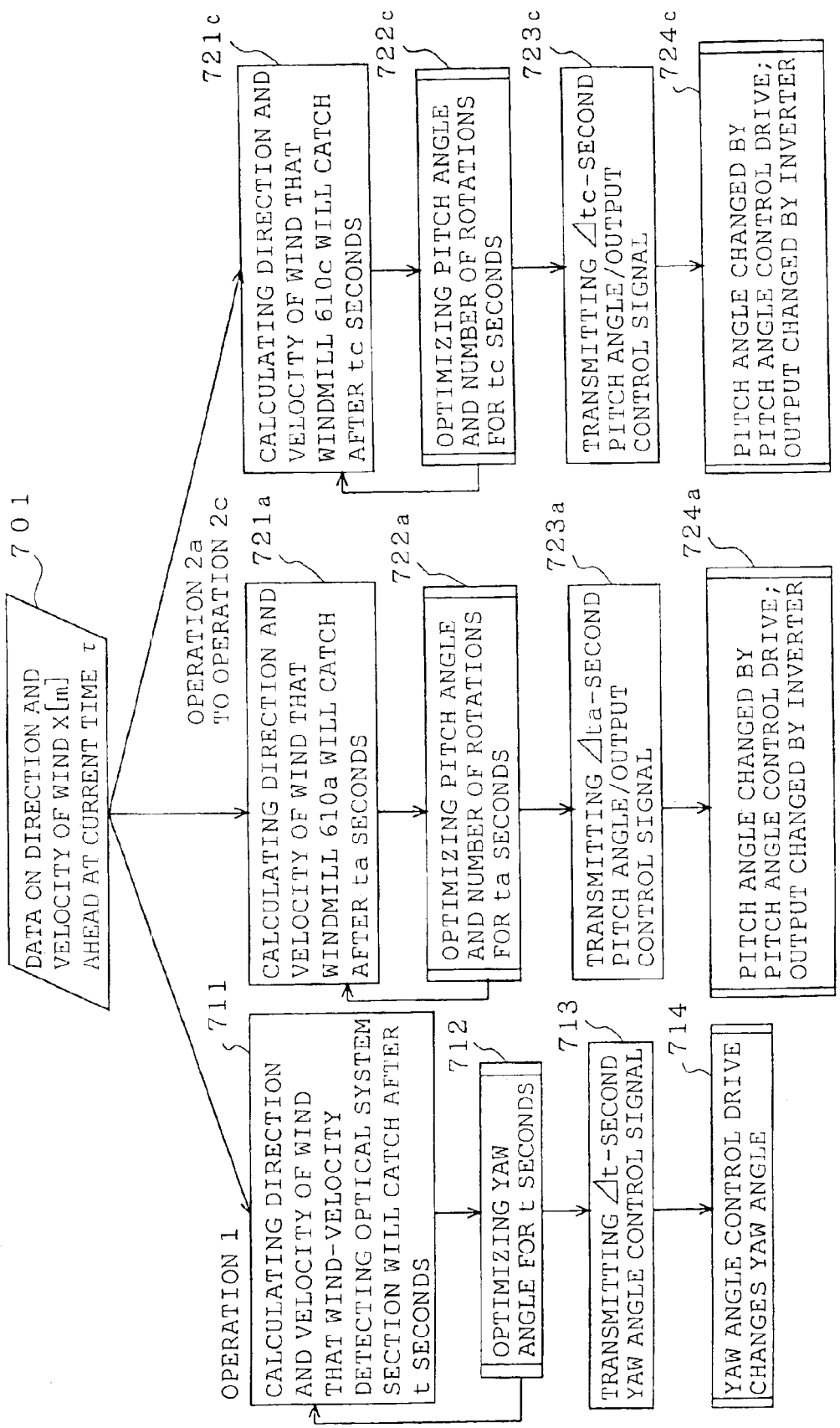
FIG. 8 is a flowchart showing control logic according to Embodiment 2 of the invention.

Subsequently, in Operation 2a of the wind power generator 610a, steps 721a to 724a in FIG. 8 are carried out. A memory incorporated in the signal processing section 300 stores positions from the laser aerovane to each of the wind power generators 610a to 610c in vector (in direction and distance), and on the basis of these data, the direction and velocity of the wind that the wind power generator 610a will catch after ta seconds are calculated (step 721a). On the basis of the obtained direction and velocity of the wind, a yaw angle maximum rotation angular velocity ωay of the wind power generator 610a and a pitch maximum rotation angular velocity ωap, yaw angle and pitch angles are optimized in the same manner as in the foregoing Embodiment 1, and number of rotations of the windmill is optimized in the case of the variable-speed generator (step 722a). Then, the calculated yaw angle control signal, pitch angle control signal, and generated energy control signal to the variable-speed generator for Δta seconds are transmitted to the controller 40a of the wind power generator 610a (step 723a).

On the basis of these signals, the controller 40a of the wind power generator 610a transmits control signals to the yaw angle control drive, the pitch angle control drive and the inverter of the wind power generator 610a. The yaw angle control drive changes the yaw angle, the pitch angle control drive changes the pitch angle, and in the case of the variable-speed generator, the inverter changes the output (step 724a). Operations 2b and 2c (steps 721c to 724c) of the wind power generators 610b and 610c similar to Operation 2a of the wind power generator 610a are also carried out at the same time.

As described above, since Operation 1 of the optical system section 200 and Operations 2a to 2c of the wind power generators 610a to 610c are carried out at the same time, the wind power generators 610a to 610c efficiently utilize the wind power energy while measuring direction and velocity of the wind under optimum conditions.

In addition, when there are many wind power generators or when the wind power generators are arranged over a very wide area, it is preferable that plural laser aerovanes are arranged to assign them the wind power generators to be controlled respectively.

Although this signal processing section 300 is provided with the calculation function for optical system section yaw angle control as well as the calculation mechanism for controlling the yaw angle, pitch angles, and output of each wind power generator in this example, it is also preferable that a calculating machine having such calculation function is separately connected to the optical system section 200, a calculating machine section is arranged on each wind power generator 610a to 610c side, or the controller 40 has the calculation function.

In the wind farm as described above, it is possible to mount a laser aerovane on each wind power generator and control the wind power generator as shown in the foregoing Embodiment 1 as a matter of course.

As for the control of the wind power generator, other than the above-mentioned prediction control carried out using the data on the current direction and velocity of wind and the data on the state of wind in the near future based on the data on the current direction and velocity of wind, it is also preferable that the wind power generator is controlled by feeding back the data on the state of wind in the past in addition to the data on the current direction and velocity of the wind and calculate the data on the state of the wind in the near future and use them. In the case of controlling the wind power generator by feeding back the data on the state of the wind in the past, the wind power generator is controlled more accurately than the case of not using those data.

Embodiment 3

The foregoing Embodiments 1 and 2 describe control examples in which rotation energy of the wind power generation system is converted into electrical energy, i.e., generated electric power is transmitted as it is to the system. In this Embodiment 3, a system arranged by combining the wind power generator, the laser aerovane, and the output-smoothing device together is employed as a wind power generation system. In this invention, an output adjustment amount of the wind power generator is calculated in advance on the basis of the wind-state prediction data obtained by the laser aerovane, and then on the basis of the calculated conditions, the output-smoothing device stores dump power otherwise releases stored energy when electric power generated by the wind power is insufficient. The same output-smoothing device is operated so that fluctuation is suppressed up to a level at which the existing power generation system of the system can follow, and the generated power of the whole system is stabilized (smoothed).

The output-smoothing device combined with the wind power generator is, for example, a storage battery, a reactive power compensator (static var compensator), or an output-limiting resistor. It is also possible to use any means as the output-smoothing device on condition that the means can conduct frequent and repeated storing and releasing of electric energy.

The output-smoothing device carries out output control so that output fluctuation of the wind power generation system is cancelled at the moment when the wind observed by the laser aerovane has arrived at the wind power generator.

The storage battery is mainly comprised of a large-size direct-current battery and a rectifier.

The reactive power compensator is equipment used in the case where wind power generation equipment is connected to an electric power system as countermeasure to counter voltage fluctuation and flickers (for preventing flicker) of the electric power system. In wind power generation, the wind necessary for generation of electric power may suddenly change, and therefore output of the wind power generator causes voltage fluctuation in the system, and generates any abnormal stop or error in other apparatus or flickers in illuminator. Therefore, the reactive power compensator may be required as countermeasure to counter those troubles.

The output-limiting resistor limits and suppresses fluctuation in the wind power generator output due to change in wind velocity. When the wind power generator output exceeds a certain value due to change in wind velocity, the excess is consumed as heat in the resistor, thereby limiting the output, and an electric power within a predetermined value is sent to the system.

As a specific example, output smoothing in the wind power generation system formed by combining the above-mentioned wind power generation wind-state prediction output control device (i.e., device for determining various control amounts on the basis of data obtained by the laser aerovane) with the output-smoothing device 80 is hereinafter described with reference to FIG. 9.

Figure 9:
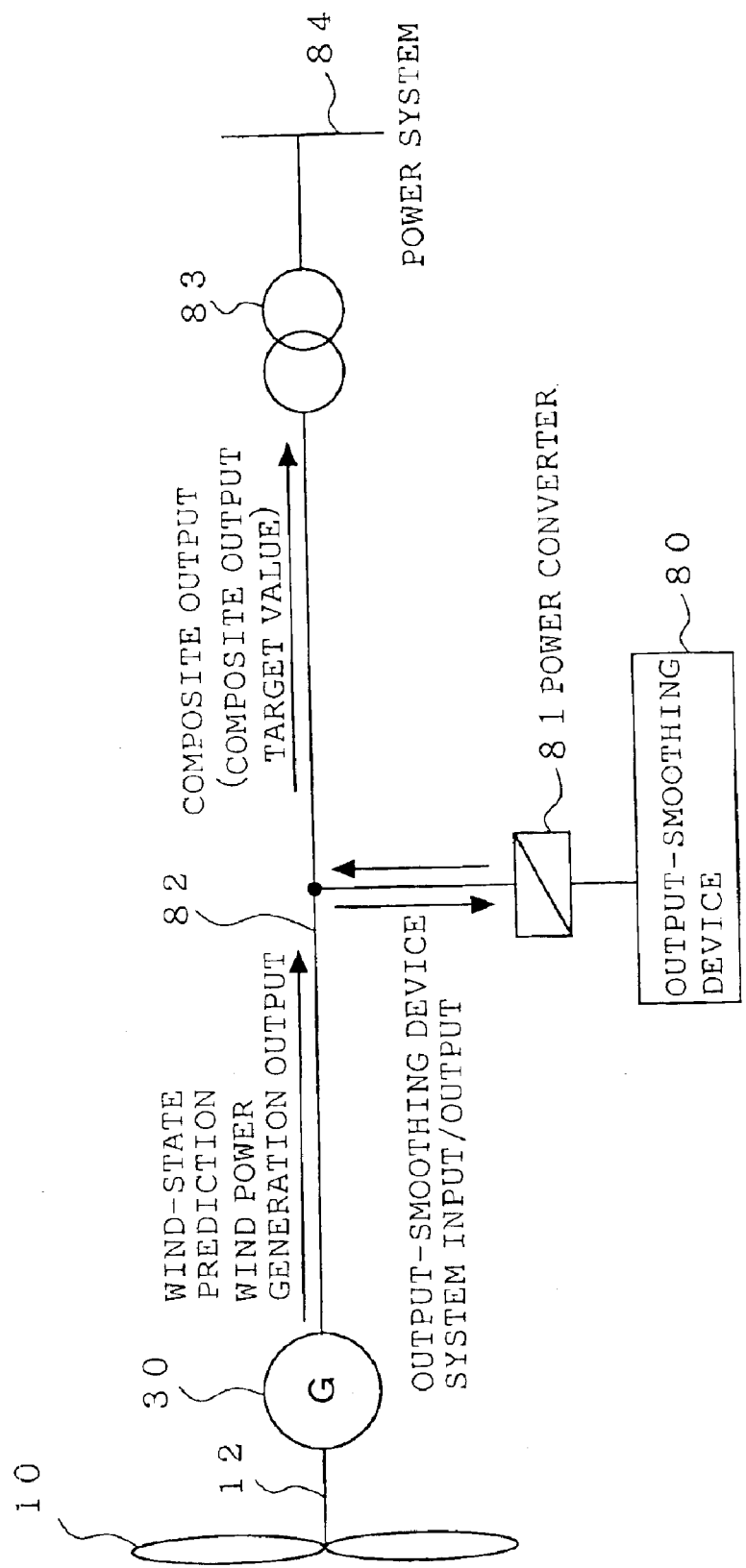
FIG. 9 is a schematic diagram showing a wind power generation system with an output-smoothing device according to Embodiment 3 of the invention.

As shown in FIG. 9, a generator 30 and an electric power system 84 installed in the wind power generator are connected through the power cable 82, and the output-smoothing device 80 is connected to the power cable 82 through the power converter 81. The transformer 83 is arranged between the power converter 81 and the electric power system 84.

As described in the foregoing Embodiment 1 and Embodiment 2, output control based on wind-state prediction of wind power generation greatly smoothes fluctuation in windmill output due to change in the state of wind, which is a disadvantage of the conventional wind power generation equipment (stabilizes the output) To cope with this, as shown in this Embodiment 3, by using the output-smoothing device 80 and the output converter 81 in addition to this output control, it becomes possible to suppress fluctuation in the wind power generator output sent to the electric power system 84 and particularly to minimize frequency fluctuation in the interfaced electric power system 84.

An output fluctuation smoothing system (including the wind power generation wind-state prediction output control device, the power converter 81 and the output-smoothing device 80) predicts a state of wind and predicts a wind power generation output thereby electric power input/output amount of the output-smoothing device 80 being predicted and controlled. Accordingly, output fluctuation in the whole wind power generation system is suppressed or completely smoothed without difficulty and, as a result, it is possible to stably supply electric power by means of the wind power generator.

In the invention, in combination with either a wind power generator capable of controlling pitch angle and/or yaw angle or a wind power generator not capable of controlling pitch angles and/or yaw angle, direction and velocity of wind that the wind power generators will catch after a certain time (for example, after 40 seconds),are predicted on the basis of the signal from the laser aerovane for measuring direction and velocity of the wind ahead of (for example, 400 m ahead of) the wind power generator with accuracy and high resolution, and electric power input/output of the output-smoothing device 80 is optimized in terms of canceling increase or a decrease in the output generated by the wind power generator.

Figure 10:
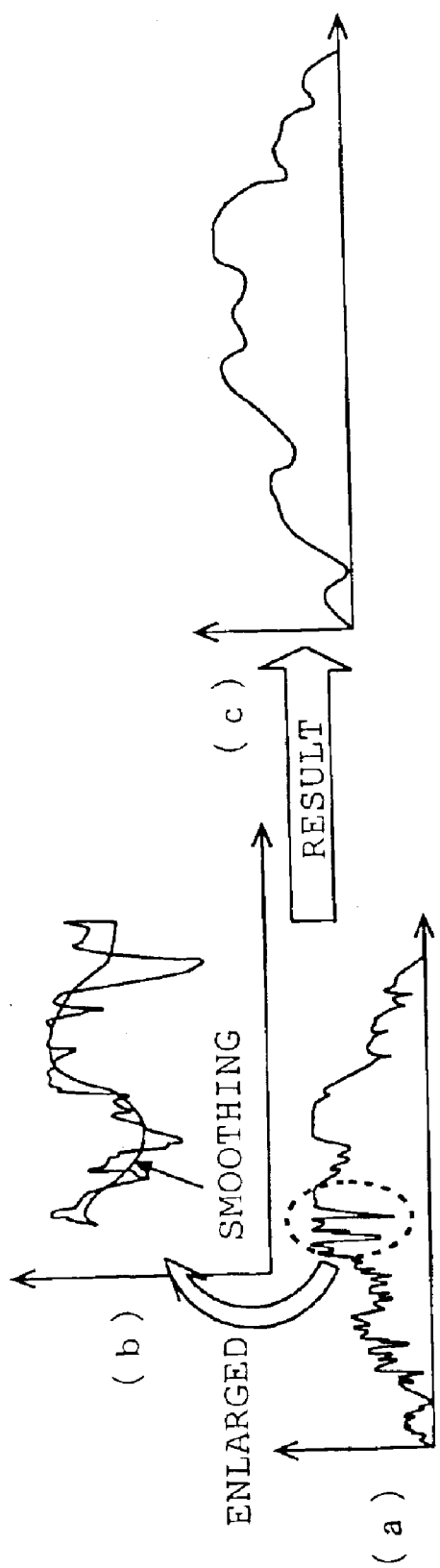
FIG. 10 is a graphic diagram showing how output values of the wind power generation system are smoothed according to Embodiment 3 of the invention.

When carrying out this control, fluctuation in the output is suppressed as shown in FIG. 10. Amount of electric power generated by the wind power generator fluctuates largely as shown in FIG. 10(*a*) when the output control is not carried out. However, since amount of generated electric power in the near future can be predicted as shown in FIG. 10(*b*), the output-smoothing device repeats charging and discharging electric energy of the windmill output due to fluctuation in wind velocity, whereby output fluctuation is suppressed as indicated by a smoothed curve in FIG. 10(*b*).

As a result, output to the system becomes as shown in FIG. 10(*c*), and the electric power does not sharply change, thus it is possible to greatly reduce influence on the electric power system 84.

In the case where capacity of the output-smoothing device 80 is sufficiently large, it is possible to completely smooth the output power of the wind power generator.

Consequently, it is possible to interlock the wind power generators without influence on the electric power system 84.

Figure 11:
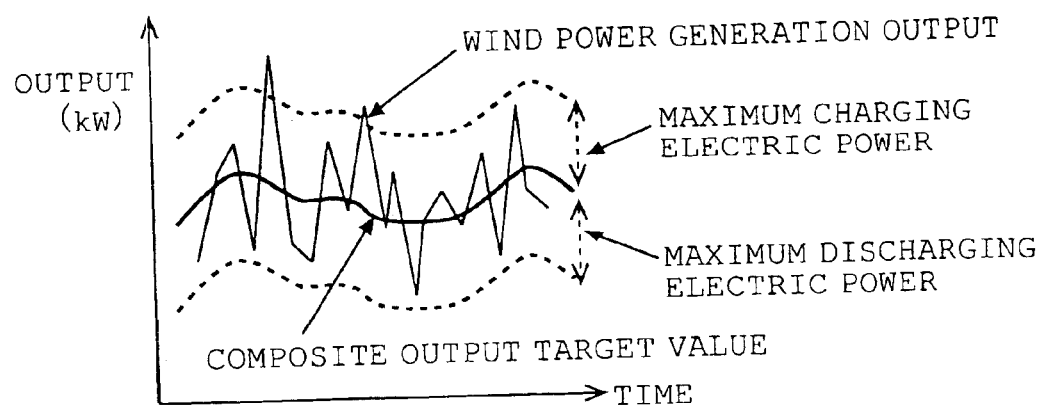
FIG. 11 is a graphic diagram showing composite output target values and wind power generation output of the wind power generation system according to Embodiment 3 of the invention.

As shown in FIG. 11, when an average value of the wind power generation output during a certain period is established as a composite output target value of the wind power generator and the output-smoothing device 80 and if the wind power generation output is larger than the composite output target value, the difference is charged into a storage battery or the like. On the other hand, if the wind power generation output is smaller than the composite output target value, the difference is discharged from the storage battery or the like. The maximum charge electric power and the maximum discharge electric power are established to be a certain value as show in FIG. 11. Broken lines indicate limit values of charge and discharge respectively. By carrying out the charge and discharge with respect to the storage battery or the like within the limited scope, it becomes possible to attain the composite output target value.

According to the invention, output of the wind power generator is predicted, and it is now possible to smooth minute fluctuation in electric power having been unable to smooth by any conventional method (fluctuation in electric power is smoothed, for example, as shown in FIG. 10(c)).

In the arrangement shown in FIG. 9, it is also preferable to utilize a conventional output-smoothing device or positively use output-smoothing function provided by a load as the output-smoothing device 80.

Figure 12:
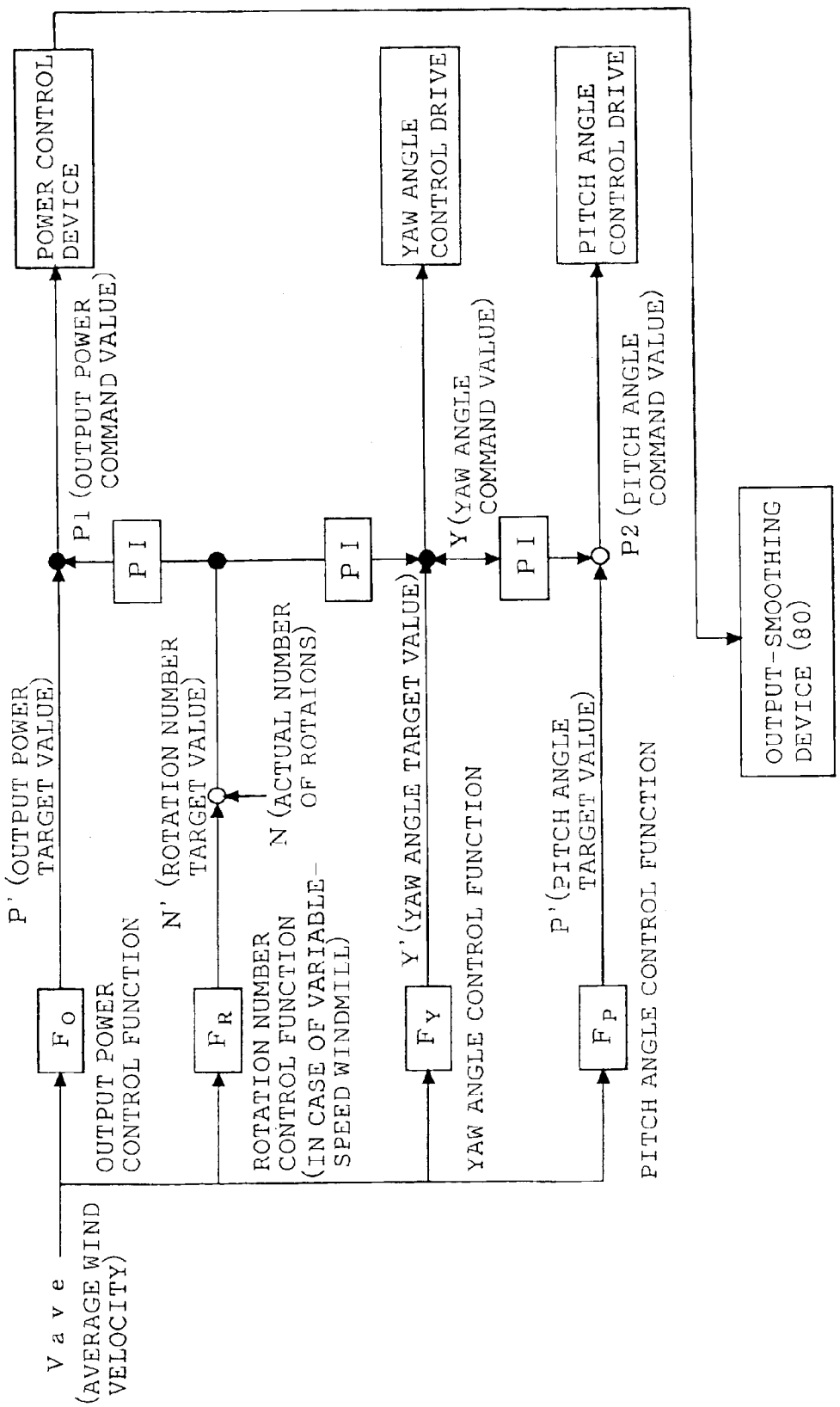
FIG. 12 is a control block diagram of the wind power generation system according to Embodiment 3 of the invention.

FIG. 12 shows a block diagram showing an example of control of the wind power generation system. On the basis of the observation result of the laser aerovane, an average wind velocity Vave of the wind blowing toward the windmill is applied to a power control function $F_O$, or applied to a rotation number control function $F_R$, a yaw control function $F_Y$ and a pitch angle control function $F_P$ in case of using the variable-speed windmill. Thus, an output power command value P1, a yaw command value Y, and a pitch angle command value P2 are calculated. Then on the basis of the calculated conditions, electric power input/output amount of the output-smoothing device 80 is adjusted, and the yaw angle control drive 50 and the pitch angle control drive 60 are driven.

In FIG. 12, in the wind power generation equipment, control items such as output power control, rotation number control, yaw control, and pitch angle control are controlled in order to stabilize the generated electric power and improve efficiency in a low wind-velocity range. A command value being the composite output target value of the wind power generation output is sent from a device for controlling output power (for example, the controller 40 or any other device equivalent to the controller 40 in function) to the output-smoothing device 80 and is used as an input/output signal of the output-smoothing device 80.

Figure 13:
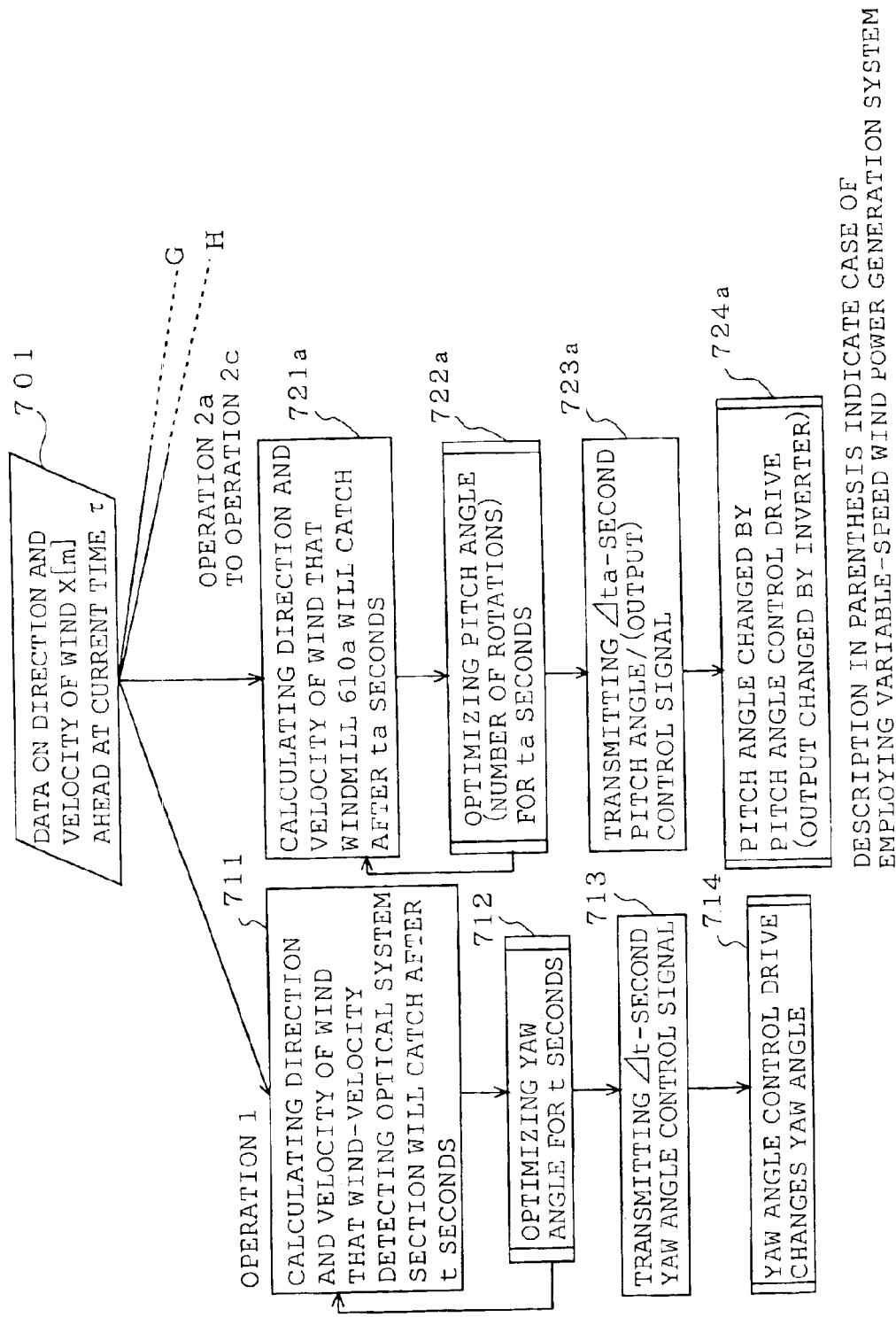
FIG. 13 is a flowchart showing control of the wind power generation system according to Embodiment 3 of the invention.
Figure 14:
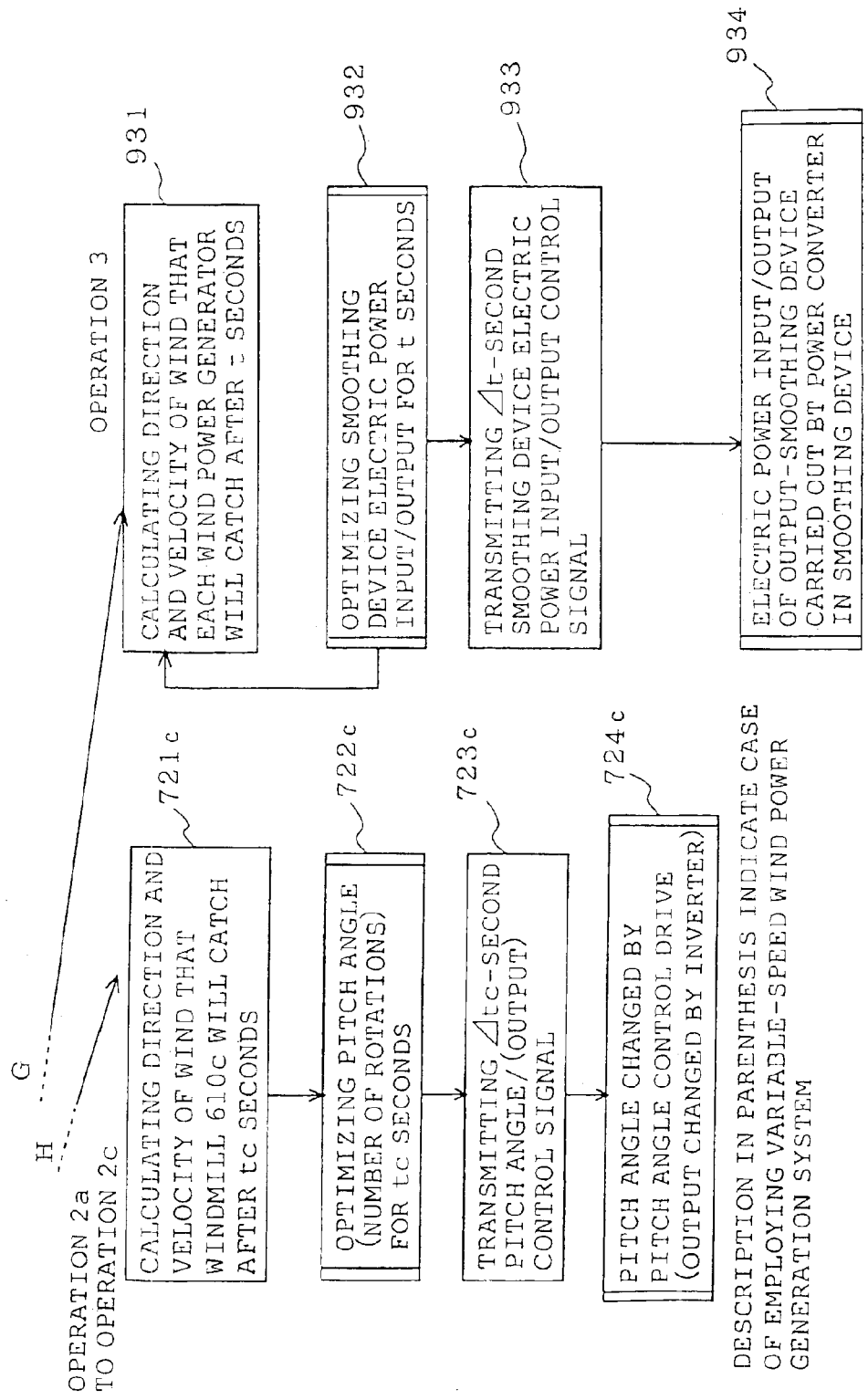
FIG. 14 is a flowchart showing control of the wind power generation system according to Embodiment 3 of the invention.

Now, operation flow in the case of combining the wind power generators and the output-smoothing device 80 is hereinafter described with reference to FIGS. 13 and 14, taking the wind power generation system in the wind farm shown in FIG. 7 as an example. Note that reference characters G and H in FIG. 13 are connected to reference characters G and H in FIG. 14 respectively, and FIG. 13 and FIG. 14 are joined to form one flowchart. The operation from step 701 to step 724a (including operation 1 and operations 2a to 2c) in FIGS. 13 and 14 is already described in the foregoing Embodiment 2, and further description thereof is omitted here.

The output-smoothing device 80 carries out Operation 3 from step 931 to step 934 in FIG. 14. The signal processing section 300 stores position from the laser aerovane to each wind power generator in the form of a vector, and calculates direction and velocity of the wind that each wind power generator will catch after t seconds on the basis of the measurement result of the laser aerovane and the foregoing position data (step 931). The signal processing section 300 calculates amount of the electric power generated by each wind power generator for t seconds in the near future on the basis of the direction and velocity of the wind that the wind power generator will catch in the near future, and this amount is used to optimize electric power input/output amount of the output-smoothing device 80 for t seconds (step 932). The electric power input/output amount is optimized is the same manner as in the foregoing Embodiment 2. At this stage, the output of the wind power generators is a total amount of electric power generated by all of the wind power generators.

The signal processing section 300 sends a control signal to the power converter 81 so that the actual electric power input/output of the output-smoothing device 80 coincides with this calculated optimum value (step 933).

On the basis of these control signals, the power converter 81 carries out electric power input/output of the output-smoothing device 80, and fluctuation in electric power of the system due to the electric power generated by the wind power generators is suppressed (step 934). These operations are carried out and repeated, and thus output fluctuation in the wind power generation system is suppressed and controlled as shown in FIG. 10(c).

Embodiment 4.

In the case of the wind power generation system (hybrid power generation system) connected to the same electric power system 84 including any electric power generating means other than the wind power generator, the output of the wind power generator is predicted on the basis of data obtained from the laser aerovane, which makes it possible to predict a control amount of the wind power generator as well as a control amount of the means for generating electric power. As a result, it is possible to smooth the output of the whole system. In this manner, the mentioned wind-state prediction is utilized also in operating various control devices of the electric power generating means using any energy other than wind power. Thus output-smoothing control of the whole system can be carried out more efficiently.

As the electric power generating means other than the wind power generator, there are, for example, diesel generator, storage battery, solar generator, or variable-speed pump. In combination with this hybrid power generation system, the output smoothing can be carried out more efficiently.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A wind power generation system comprising:

a wind power generator; and a laser aerovane mounted on said wind power generator or located near said wind power generator, said laser aerovane observing direction and velocity of wind blowing toward said wind power generator and controlling at least one yaw angle and pitch angle of said wind power generator based on the direction and the velocity of the wind observed by said laser aerovane, said laser aerovane observing the direction and the velocity of the wind blowing towards said wind power generator by emitting a laser beam ahead of said wind power generator, detecting scattered waves of the laser beam, scattered by an aerosol located at any position distant from said wind power generator, at an arbitrary distance, and that floats in the air and moves on the wind at the same speed as the wind, and detecting a phase difference between the laser beam and the scattered waves in terms of the Doppler effect.

2. The wind power generation system according to claim 1, wherein said wind power generator includes a variable-speed generator, and number of rotations of said wind power generator is controlled based on the direction and the velocity of the wind observed by said laser aerovane.

3. The wind power generation system according to claim 1, wherein, in a wind farm where plural wind power generators are arranged, output of the wind farm is stabilized based on observation by at least one laser aerovane in the wind farm.

4. The wind power generation system according to claim 1, further comprising additional electric power generating means connected to an electric power system in the same manner as said wind power generator connected to the electric power system, wherein output of the wind power generation system including said wind power generator and said additional electric power generating means is controlled based on the direction and the velocity of the wind observed by said laser aerovane, and output of the wind power generation system including said additional electric power generating means is stabilized.

5. A wind power generation system comprising:

a wind power generator;

a laser aerovane mounted on said wind power generator or located near said wind power generator; and an output-smoothing device connected to said wind power generator, wherein said laser aerovane observes direction and velocity of wind blowing toward said wind power generator, adjustment of power produced by said wind power generator is calculated in advance of arrival of the wind observed by said laser aerovane, based on results obtained by observation by said laser aerovane, power output of the wind power generation system including said wind power generator and said output-smoothing device is controlled based on conditions obtained by calculation, power output of the wind power generation system is stabilized, and said output-smoothing device controls output so that power output fluctuation of said wind power generation system is cancelled when the wind observed by said laser aerovane arrives at said wind power generator.

6. The wind power generation system according to claim 5, wherein said wind power generator includes a variable-speed generator and said output-smoothing device controls output frequency fluctuation and output voltage fluctuation of said wind power generation system within a predetermined range.

7. The wind power generation system according to claim 5, wherein said output-smoothing device is selected from the group consisting of a storage battery, a reactive power compensator, and an output limiting resistor.

8. A wind power generation system comprising:

a wind power generator;

a laser aerovane mounted on said wind power generator or located near said wind power generator; and an output-smoothing device connected to said wind power generator, wherein said laser aerovane observes direction and velocity of wind blowing toward said wind power generator, adjustment of power produced by said wind power generator is calculated in advance of arrival of the wind observed by said laser aerovane based on results obtained by observation by said laser aerovane power output of the wind power generation system including said wind power generator and said output-smoothing device is controlled based on conditions obtained by calculation, power output of the wind power generation system is stabilized, and said laser aerovane observes the direction and the velocity of the wind blowing towards said wind power generator by emitting a laser beam ahead of said wind power generator, detecting scattered waves of the laser beam scattered by an aerosol located at any position distant from said wind power generator, at an arbitrary distance, and that floats in the air and moves on the wind at the same speed as the wind, and detecting a phase difference between the laser beam and the scattered wave in terms of the Doppler effect.

9. The wind power generation system according to claim 5, wherein, in a wind farm where plural wind power generators are arranged, output of the wind farm is stabilized based on observation by at least one laser aerovane in the wind farm.

10. The wind power generation system according to claim 5, further comprising additional electric power generating means connected to an electric power system in the same manner as said wind power generator connected to the electric power system, wherein output of the wind power generation system including said wind power generator and said additional electric power generating means is controlled based on the direction and the velocity of the wind observed by said laser aerovane, and output of the wind power generation system including said additional electric power generating means is stabilized.

11. The wind power generation system according to claim 8, wherein said output-smoothing device is selected from the group consisting of a storage battery, a reactive power compensator, and an output limiting resistor.

12. The wind power generation system according to claim 8, wherein, in a wind farm where plural wind power generators are arranged, output of the wind farm is stabilized based on observation by at least one laser aerovane in the wind farm.

13. The wind power generation system according to claim 8, further comprising additional electric power generating means connected to an electric power system in the same manner as said wind power generator connected to the electric power system, wherein output of the wind power generating system including said wind power generator and said additional electric power generating means is controlled based on the direction and the velocity of the wind observed by said laser aerovane, and output of the wind power generation system including said additional electric power generating means is stabilized.

* * * * *